CATHODE-RAY TUBE LINEARITY CORRECTOR

Filed June 21, 1968 3 Sheets-Sheet 1

INVENTOR
FRED A. SPEAKS

E. Mickey Hubbard
ATTORNEY

INVENTOR

FRED A. SPEAKS

E. Mickey Hubbard

ATTORNEY

CATHODE-RAY TUBE LINEARITY CORRECTOR

Filed June 21, 1968 3 Sheets-Sheet 3

E. Mickey Hubbard
ATTORNEY

United States Patent Office 3,518,481

Patented June 30, 1970

3,518,481
CATHODE-RAY TUBE LINEARITY CORRECTOR

Fred A. Speaks, Dallas, Tex., assignor to Texas Instruments Incorporated, Dallas, Tex., a corporation of Delaware Filed June 21, 1968, Ser. No. 739,017
Int. Cl. H01j *29/56, 29/72*
U.S. Cl. 315—24 15 Claims

ABSTRACT OF THE DISCLOSURE

A system for correcting the deflection signals coupled to a cathode-ray tube to produce a linear display having four linear modifier circuits. Two of the four circuits are employed to modify the Y-deflection signals and the other two for modifying the X-deflection signals. Basically, the modifier circuits consist of a linear amplifier as a current control device coupled to the absolute value of the second deflection signal. Thus, for correcting the Y-deflection signal the current control device would be responsive to the absolute value of the X-deflection signal. When either of the deflection signals varies on-axis, an optional on-axis correcting circuit may be employed. To provide optimum linear correction, a series of breakpoint sections may be paralleled and connected to individual current control devices each responsive to the second deflection signal.

This invention relates to cathode-ray tube displays, and more particularly, to a system for correcting each of the deflection signals coupled to a cathode-ray tube to produce a linear display thereon.

Although not necessarily limited thereto, this invention is particularly useful in the generation of photo masks for integrated circuit fabrication. As the state of the art of integrated circuit techniques advances, more complex circuitry will be included on a single wafer. With present techniques of manufacturing integrated circuits, one or more photo masks are required in the fabrication process, and as the circuitry becomes more complex, the photo masks also become more complex, thereby increasing the difficulty and expense of preparation. Recently, computers have been employed in an attempt to simplify the production of photo masks and also reduce the man-hours required.

A number of different systems have been proposed to operate in conjunction with a computer in the preparation of photo masks for integrated circuit fabrication. One such system incorporates a step-and-repeat camera coupled to the output of a computer. Although the step-and-repeat camera performs satisfactorily, such systems are usually bulky and expensive pieces of equipment. Another system available for photo mask production is an X–Y plotting table consisting of two slides moving along perpendicular axes; each slide being driven by a stepping motor through a drive chain. In both the above systems, the mechanical apparatus involved limits the accuracy with which a photo mask can be reproduced from a computer program.

A much more sophisticated system for producing photo masks employs a cathode-ray tube coupled to the output of a computer. The problem with presently available cathode-ray tube systems is that the electron beam deflects through an arc against the flat face plate of the cathode-ray tube. Several attempts have been made to solve this problem, including shaping the face plate of the CRT, and using a shaped fibre optic face plate. Due to the complexity and alignment problems of both the shaped face plate and fibre optic face plate CRT, the costs involved in such solutions are exorbitant. Also, phosphor deposition on both these tubes is difficult, thus degrading tube quality. Possibly of more significance, the best known results of photo mask production using either the flat face plate or fibre optic tube have achieved a linear accuracy of only about 0.25%. This is at least one order of magnitude less than satisfactory for photo mask production.

The most generally used method of correcting CRT nonlinearity is by means of magnetic correction. The magnetic corrector actually modifies the electron beam displacement to present a linear display. Although it is possible to achieve a linear bit accuracy on the order of 0.2% using magnetic correction, there is a marked reduction in display resolution.

In accordance with the present invention, there is provided a cathode-ray tube display having a linear relationship with respect to the deflection input signals. Prior to connecting to the CRT deflection input terminals, the deflection signals are corrected by means of a linear amplifier functioning as a current control device. The linear amplifier corrects one deflection signal by the absolute value of the second deflection signal connected thereto. A series of slope shaping networks connected to the absolute value deflection signal limits the operation of the linear amplifier to further improve the signal correction.

To linearize the display obtained with a high resolution cathode-ray tube, it is an object of this invention to provide a signal corrector for linearizing a cathode-ray tube display to the bit accuracy of a control computer. Another object of this invention is to provide a signal corrector to produce high resolution linear cathode-ray tube displays. A further object of this invention is to provide a signal corrector to produce stable and repeatable linear cathode-ray tube displays from a computer output. Still another object of this invention is to provide a signal corrector for modifying the deflection signals coupled to a cathode-day tube.

Other objects and advantages of the invention will be apparent from the specification and claims and from the accompanying drawings illustrative of the invention.

Referring to the drawings.

Figures 1, 3:
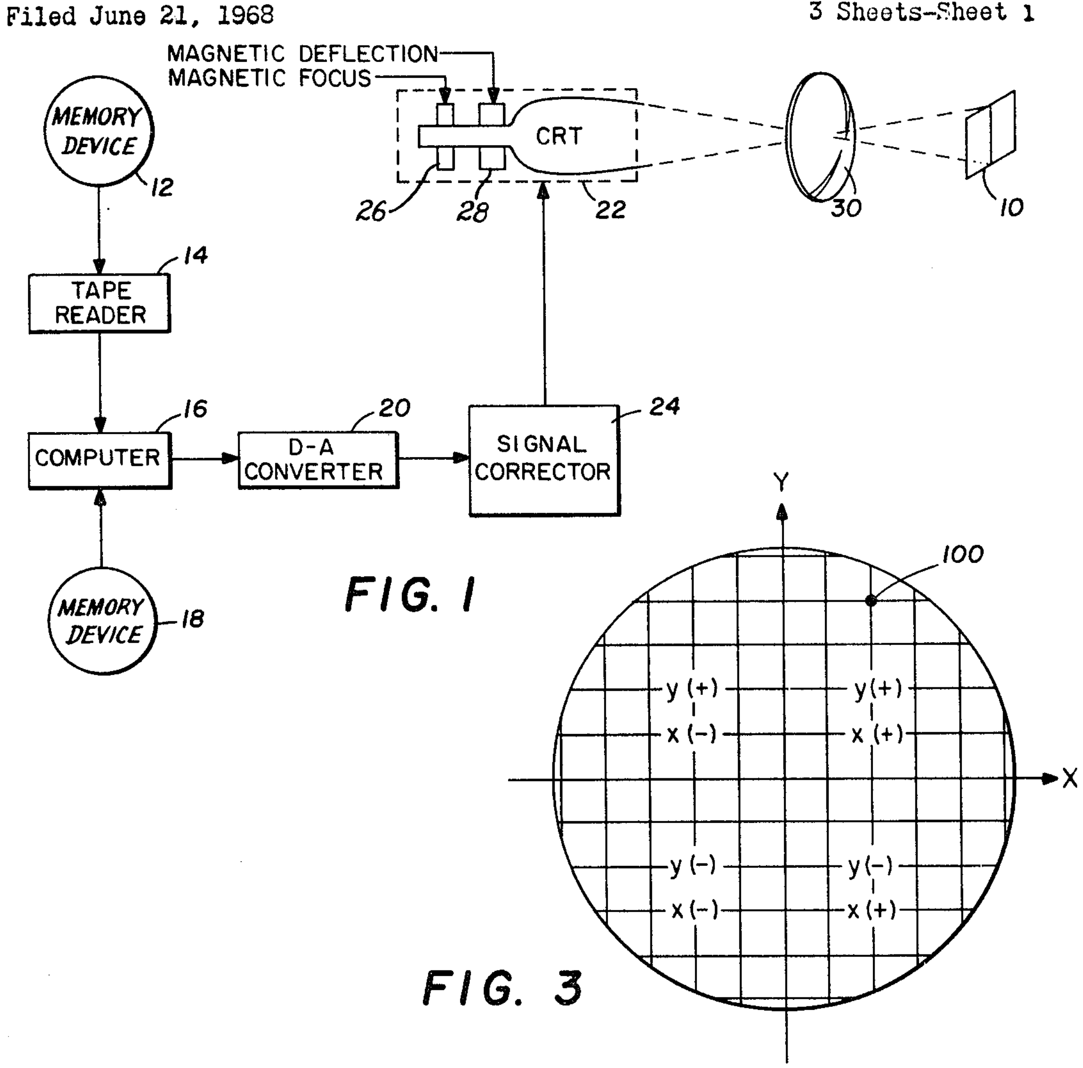
FIG. 1 is a block diagram showing a computer controlled cathode-ray tube display system.
FIG. 3 is a plan view of the face plate of a cathode-ray tube illustrating the four quadrants requiring separate modifier circuits.

Referring now to the drawings, and in particular to FIG. 1 where there is shown a block diagram of a system for producing a photographic recording 10. The recording 10 may be a photo mask for use in the fabrication of integrated circuits. A pattern on the record 10 is a pictorial representation stored on a computer tape 12 or other memory device. The information stored on the tape 12 is transferred by a tape reader 14 to a computer 16. If the pattern on the record 10 contains areas which are common to several such records, a second paper tape 18 or other memory device may also be arranged to feed information to the computer 16.

The computer 16 correlates the information from the tapes 12 and 18 and generates a digital code representing the desired picture on the photographic record 10. This digital code is converted to analog voltages by a D/A converter 20. The analog voltages from the converter 20 are the X and Y deflection signals connected to the deflection amplifiers (not shown) of a cathode-ray tube 22.

In accordance with the present invention, instead of the output of the D/A converter 20 being connected directly to the CRT 22, the X and Y deflection signals are modified in a signal corrector 24. The signal corrector 24 modifies the output voltages from the converter 20 to display X and Y deflections on the face of the CRT 22 that have a linear relationship to the X and Y signals from the D/A converter. In the usual manner, the cathode-ray tube 22 contains a magnetic focusing coil 26 and a magnetic deflection coil 28 to initially focus the electron beam of the tube 22. Since the coils 26 and 28 form no part of this invention, additional discussion of these components will not be given. However, it should be noted that the CRT 22 may be either magnetically or electrostatically focused, and magnetically or electrostatically deflected. Cathode-ray tubes employing combinations of the above may also be used with the signal corrector of this invention, including magnetic or electrostatic sub-scanning with magnetic or electrostatic main scanning.

Where necessary, an optical system is positioned between the CRT 22 and the photographic record 10. As illustrated in FIG. 1, the optical system comprises a lens 30 for reducing the 3 inch image of the tube 22 to a 1.5 x 1.5 inch image on the record 10. Although the record 10 is illustrated as a single film plane, it will be understood that such recordings may be made on roll film. This film may be continuously processed after being exposed to the pattern displayed on the CRT 22.

As mentioned above, the analog output signals from the D/A converter 20 represent the input to the signal corrector 24 of this invention. It should be understood that the signal corrector will modify any analog input signal, including raster scan signals. When the corrector 24 receives raster scan signals, the CRT 22 operates in a scanning mode. In this mode, the recording 10 would be replaced with the image to be scanned and a suitable light detector system, such as photomultiplier tube, would be added to the system.

Figure 2:
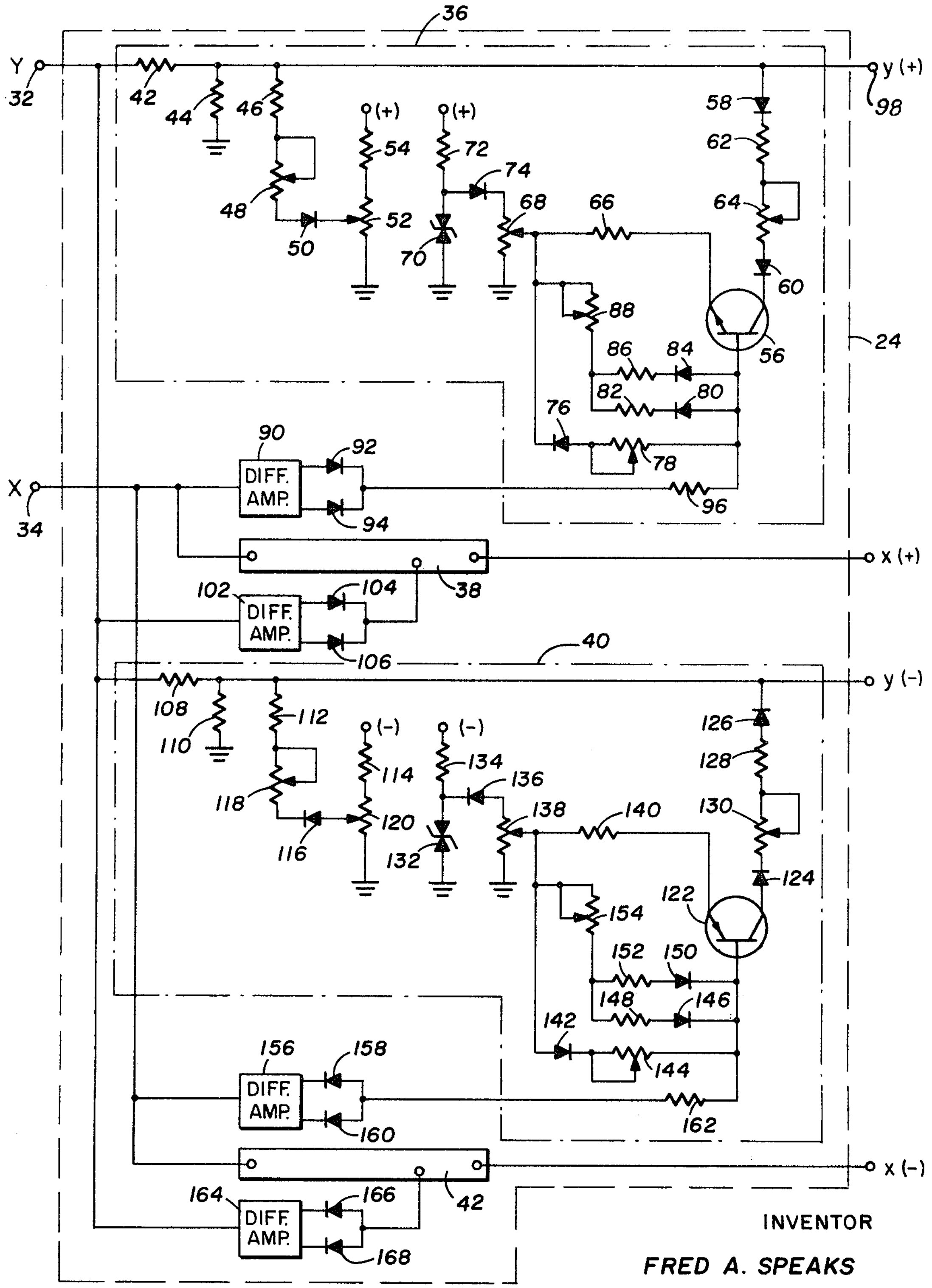
FIG. 2 is an electrical schematic of the signal corrector of the system illustrated in FIG. 1.

Referring now to FIG. 2, there is shown schematically a signal corrector 24. Deflection signals in the Y direction are received from the D/A converter 20 at an input terminal 32 and X deflection signals are received at an input terminal 34. The signal corrector illustrated in FIG. 2 consists of two modifier circuits 36 and 38 for generating $y(+)$ and $x(+)$ deflected signals, respectively, for the CRT 22. Also included are modifier circuits 40 and 42 for generating $y(-)$ and $x(-)$ deflection signals, respectively, to the cathode-ray tube. The difference between the modifiers for generating (+) deflection signals from those producing (−) deflection signals lies in the connection of the various diodes and the types of transistor employed as a linear amplifier.

Considering first the modifier 36, a Y-deflection signal at the terminal 32 generates a current flow in a resistor 42 which is part of an input network including a resistor 44. Where only a Y-deflection signal exists, that is, the X-deflection equals zero, an on-axis corrector may be included to modify the Y-deflection signal to produce a linear display on the CRT 22. This on-axis corrector includes a resistor 46 in series with a potentiometer 48 and a diode 50. The cathode electrode of the diode 50 connects to the wiper arm of a potentiometer 52 which is in series with a resistor 54 coupled to a positive direct current supply (not shown). By properly adjusting the potentiometers 48 and 52 to the current flow characteristics of the diode 50, the on-axis corrector modifies positive Y-deflection signals from the D/A converter 20 to produce a linear deflection along the positive Y-axis of the CRT 22. Thus, when the magnitude of the X-deflection signal is substantially zero, the base drive voltage to the transistor 56 is insufficient to bias transistor 56 into conduction. Current modification of the Y-deflection signal is therefore solely provided by the on-axis corrector above described. Note, only positive Y-deflection signals are corrected in the modifier 36.

When Y-deflection signals are connected to the terminal 32 and X-deflection signals, either positive or negative, are connected to the terminal 34, then a linear amplifier including an NPN transistor 56 provides the Y-axis correction. Connected to the collector electrode of the transistor 56 is a series circuit consisting of diodes 58 and 60, a resistor 62, and a potentiometer 64. This series arrangement of components also connects to the terminal junction of resistors 42 and 44. The emitter electrode of transistor 56 is tied to a resistor 66 which in turn connects to the wiper arm of a potentiometer 68. The potentiometer 68 provides a means for adjusting the initial conduction point of the transistor 56.

The potentiometer 68 is part of a regulated voltage bias supply including a Zener diode 70 in series with a resistor 72 coupled to the positive terminal of a direct current supply (not shown). At the junction of the resistor 72 and the Zener diode 70 there is connected the anode electrode of a diode 74 which also connects to the potentiometer 68.

Bias voltages for controlling the base electrode of the transistor 56 are provided by means of a configuration of slope shaping networks. The number of slope shaping networks to be used depends on the size of the CRT 22 and the degree of linearity required. As shown, there are three such slope adjusting networks in parallel connected to the base electrode of the transistor 56 and the wiper arm of the potentiometer 68. Each of these three slope shaping networks begins operation at a different absolute value of the X-deflection voltage appearing at the terminal 34. A network including the diode 76 in series with a potentiometer 78 conducts first to establish an initial slope to the base drive voltage of the transistor 56. After the absolute value of the X-deflection signal has reached a second level, the network including the diode 80 in series with a resistor 82 establishes a second slope to the base drive voltage. Then at a third value for the X-deflection signal, the slope network consisting of the diode 84 in series with a resistor 86 provides the final slope for the base drive voltage. The last two slope networks may be adjusted by means of a potentiometer 88 coupled to the wiper arm of the potentiometer 68 and the resistors 82 and 86. Primarily, the slope networks shape the base drive voltage to provide the correct modification of the Y-deflection signals. In addition, these networks also prevent the transistor 56 from being operated in a saturation condition.

To produce the absolute value of the X-deflection signals for the base drive of transistor 56, a differential amplifier 90 receives the X-deflection signals from the D/A converter 20. The differential amplifier 90 includes a standard circuit configuration that generates one of two output voltages depending on the polarity of the input signal. One of the output terminals of the differential amplifier 90 is connected to the anode electrode of a diode 92 and the second output terminal connected to the anode electrode of a diode 94. The cathode electrodes of these diodies are interconnected to a resistor 96 which ties to the base electrode of the transistor 56 and the slope shaping networks.

In operation, of the modifier 36, a Y-deflection signal and an X-deflection signal are received from the D/A converter 20 at the terminals 32 and 34. A positive Y-deflection signal forward biases the diodes 58 and 60 thereby establishing a collector bias voltage for the transistor 56. Note, this collector bias voltage varies in proportion to the Y-deflection variations. The absolute value of the X-deflection signal provides the base drive voltage for the transistor 56 as modified by the slope shaping networks as described previously. Thus, the current flowing through the transistor 56 is a function of the Y-deflection signal connected to the collector electrode and the shaped X-deflection signal connected to the base electrode. By adjusting the various potentiometers, the current flow through the transistor 56 and consequently the voltage appearing at the $y(+)$ output terminal 98 will be such as to produce a linear deflection in the upper half of the display as illustrated at point 100 in FIG. 3. Regardless of how the point 100 varies above the X-axis, whether in the positive X quadrant the negative X quadrant, the modifier 36 will produce a linear deflection for the Y-deflection signals.

Where the on-axis corrector is not included in the system, the transistor 56 also functions to modify Y-deflection signals that vary along the Y-axis. In this situation, the transistor 56 applies a correction only as a function of collector voltage since the base voltage remains at a fixed value established by the slope shaping networks.

For a point, such as point 100, that has both a Y-deflection and an X-deflection component, a second modifier is required to linearize the X-deflection component. To completely locate the point 100, the modifier 38 corrects positive X-deflection signals. Modifier 38 will be similar to the modifier 36 with the exception that the signal connected to resistor 42 is an X-deflection signal and a differential amplifier 102, with diodes 104 and 106 connected thereto, generates the absolute value of the Y-deflection signal as a base drive voltage. Thus, each point appearing in the $[y(+), x(+)]$ quadrant requires correction in the modifiers 36 and 38 to produce a linear deflection.

For negative Y-deflection signals the modifier 40 provides the necessary correction. Modifier 40 basically resembles the modifier 36 with the exception that a PNP transistor is used in the linear amplifier and the various diodes are reversed. Thus, the modifier 40 includes an input network of resistors 108 and 110 followed by an on-axis corrector (optional) made up of resistors 112 and 114, a diode 116, and potentiometers 118 and 120. To correct negative Y-deflection signals, the on-axis corrector is energized from the negative terminal of a direct current supply (not shown). The modifier 40 also includes a PNP transistor 122 as a linear amplifier having a collector electrode connected to a series circuit consisting of diodes 124 and 126, a resistor 128, and a potentiometer 130. To bias the emitter electrode of the transistor 122 there is provided a voltage regulator circuit including a Zener diode 132 in series with a resistor 134 coupled to the negative terminal of a direct current supply (not shown). The emitter bias source also includes a diode 136 in series with a potentiometer 138 having a wiper arm connected to a resistor 140 which is tied to the emitter electrode of the transistor 122. Three base drive slope shaping networks are again shown; the first slope shaping network includes a diode 142 in series with a potentiometer 144, the second consists of a diode 146 in series with a resistor 148, and the third slope network comprises a diode 150 in series with a resistor 152. Resistors 148 and 152 are interconnected to a potentiometer 154 that connects to the wiper arm of the potentiometer 138. Absolute values of the X-deflection signal are generated by a differential amplifier 156 having diodes 158 and 160 connected to the output terminals thereof and interconnected to a base drive resistor 162.

Operationally, the modifier 40 is similar to the modifier 36 with the exception that negative voltages cause the diodes to be forward biased.

Negative X-deflection signals are corrected by the modifier 42 which may be similar to the modifier 40. The signal connected to the resistor 108 now, however, represents the X-deflection signals and a differential amplifier 164 responds to the Y-deflection signals at terminal 32. The differential amplifier 164 provides absolute values of the Y-deflection signal to the modifier 42 by means of diodes 166 and 168 interconnected to the resistor 162.

By controlling the current flow through the linear amplifiers in the modifiers 36, 38, 40 and 42, both positive and negative X and Y-deflection signals may be corrected to produce a linear display on the cathode-ray tube 22.

Referring to FIG. 3, for a display in the $[y(+)x(+)]$ quadrant the modifiers 36 and 38 provide the necessary correction to the X and Y-deflection signals such that the display is linearized. In the $[y(-),x(+)]$ quadrant the modifiers 38 and 40 provide the necessary correction to produce a linear display in this quadrant. In quadrant $[y(-),x(-)]$ the modifiers 40 and 42 correct the Y and X-deflection signals, respectively, to produce a linear display in this quadrant. Finally, in the $[y(+),x(-)]$ quadrant the modifiers 36 and 42 operate on the deflection signals to produce a linear display. Thus, the four modifiers illustrated in FIG. 2 as one embodiment of the signal corrector 24, provide a linear display in all areas of the CRT 22.

Figure 4:
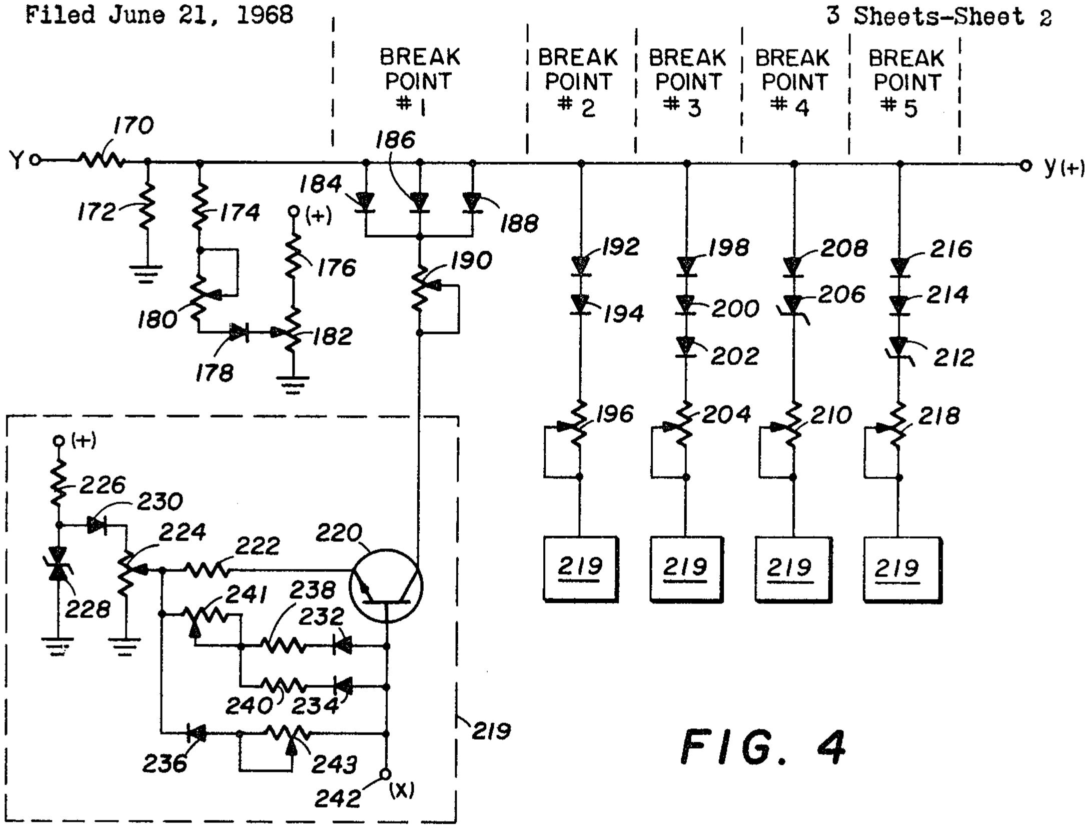
FIG. 4 is an electrical schematic of an alternate embodiment of a signal corrector having a series of breakpoint area circuits individually coupled to separate linear amplifiers.

The signal corrector 24 illustrated in FIG. 2 and described above is a single "breakpoint" corrector; that is one modifier corrects all the positive Y-deflection signals another modifier all the negative Y-deflection signals, a third all the positive X-deflection signals and the fourth all the negative X-deflection signals. For additional accuracy in the linear display, the modifiers are expanded to include additional linear amplifiers, such as transistor 56, to provide additional breakpoint areas. Referring to FIG. 4, there is shown a modifier for positive Y-deflection signals including an input network of resistors 170 and 172 followed by an on-axis corrector consisting of resistors 174 and 176, a diode 178, and potentiometers 180 and 182. The first breakpoint area has paralleled diodes 184, 186 and 188 in series with a potentiometer 190. Breakpoint area No. 2 includes diodes 192 and 194 in series with a potentiometer 196. The lowest values of a Y-deflection signal are corrected by the circuitry of breakpoint No. 1. After the Y-deflection signal has passed a certain level, the second breakpoint area performs the function of signal modification to produce a linear display. A third breakpoint area consisting of diodes 198, 200 and 202, in series with a potentiometer 204, provides correction for positive Y-deflection signals between a second and third signal level. After the third level has been exceeded, the fourth breakpoint area cuts in to correct the Y-deflection signal up to a fourth level. The fourth breakpoint area includes a Zener diode 206 in series with a diode 208 and a potentiometer 210. Breakpoint area No. 5, which consists of a Zener diode 212 in series with diodes 214, 216 and a potentiometer 218, modifies the positive Y-deflection signals above a fourth signal level.

Each of the breakpoint circuits performs its correcting function by means of a linear amplifier 219 identical to the amplifier described with reference to the modifier 36 of FIG. 2. As such, each includes a NPN transistor 220 having a collector electrode coupled to the breakpoint area circuitry and an emitter electrode in series with a resistor 222. The resistor 222 also connects to the wiper arm of potentiometer 224 which forms a part of a bias supply circuit connected to the positive terminal of a direct current supply (not shown). This bias supply further includes a resistor 226 in series with a regulator diode 228, and a diode 230 connected to the resistor 226 and to the potentiometer 224. A base drive slope shaping network is provided to prevent saturation of the transistor 220. The network includes diodes 232, 234 and 236, resistors 238 and 240, and potentiometers 241 and 243. The absolute value of the X-deflection signal connects to terminal 242 of each of the breakpoint area circuits.

Operationally, each breakpoint area amplifier functions as described previously with respect to the modifier 36 of FIG. 2. As explained, up to a first voltage level of the Y-deflection signal the breakpoint No. 1 provides the necessary signal modification. Between the first voltage level and a second voltage level the breakpoint No. 2 provides the signal correction; between the second voltage level and a third voltage level the breakpoint No. 3 modifies the Y-deflection signal; between the third voltage level and a fourth voltage level the breakpoint No. 4 corrects the deflection signal; and between the fourth voltage level and the maximum voltage level the fifth breakpoint circuit corrects the Y-deflection signal. Each of the breakpoint area circuits operates independently of the other and is not influenced by the operation of any of the other linear amplifiers.

To correct all four quadrants of the display as shown in FIG. 3, four of the modifiers illustrated in FIG. 4 would be required as described with reference to FIG. 2. For correcting positive Y and X-deflection signals, the modifier of FIG. 4 is substituted for the modifiers 36 and 38 of FIG. 2. To provide correction for negative Y and X-deflection signals, the circuit of FIG. 4 must be modified by reversing all the diodes and substituting PNP transistors for the NPN transistors shown. These modified circuits would then be substituted for the modifiers 40 and 42 of FIG. 2.

Figure 5:
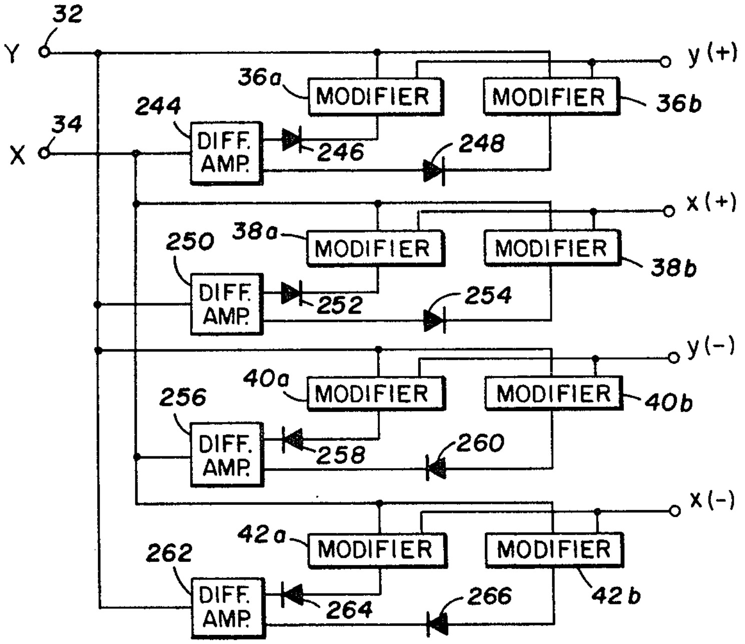
FIG. 5 is a block diagram of still another embodiment illustrating a modification of the system of FIG. 2.

Referring to FIG. 5, there is shown a system for producing a linear display on non-symmetrical cathode-ray tubes. To correct positive Y-deflection signals, two modifiers 36 are connected in parallel to the input terminal 32. A differential amplifier 244 responds to the X-deflection signals at terminal 34. One output terminal of the differential amplifier 244 connects to the modifier **36*a* through a diode 246 and the second output terminal connects to the modifier 36*b* through a diode 248. As explained previously, one output terminal of the differential amplifier 244 generates a positive signal for one polarity of input signal and the other output generates a positive signal for the opposite polarity of input signal. If diode 246 conducts for positive values of X-deflection signals, the nthe modifier 36*a* corrects the Y-deflection signals by turning on the transistor 56. When diode 246 is forward biased, diode 248 will be reverse biased and the transistor 56 of the modifier 36*b* will be nonconducting. During this cycle, the modifier 36*b* will be turned off and nonexective for signal correction. However, when the X-deflection signal goes negative, then diode 248 will be forward biased and diode 246 back biased. Now the modifier 36*b*** corrects the Y-deflection signals.

By adjusting the various potentiometers in the modifier circuits, different amounts of correction can be provided between the modifiers **36*a* and 36*b*. With reference to FIG. 3, the modifier 36*a* corrects deflection signals in the $[y(+),x(+)]$ quadrant and the modifier 36*b*** corrects signals in quadrant $[y(+),x(-)]$.

For the X-deflection signals and for negative Y-deflection signals similar circuitry is provided. Modifiers **38*a* and 38*b* are connected in parallel to the terminal 34 and controlled by Y-deflection signals from a differential amplifier 250. The differential amplifier 250 has an input terminal tied to the terminal 32 and one output terminal connected through a diode 252 to the modifier 38*a* and a second output connected through a diode 254 to the modifier 38*b***. This arrangement corrects for positive X-deflection signals and provides different correction between the positive and negative Y quadrants.

To correct for negative Y-deflection signals the modifiers **40*a* and 40*b* are controlled from a differential amplifier 256 through diodes 258 and 260, respectively. Correction of negative X-deflection signals may be accomplished by the modifiers 42*a* and 42*b* as controlled from a differential amplifier 262 through diodes 264 and 266**. Thus, the system of FIG. 5 is basically that of FIG. 2 with each of the modifiers duplicated and the output of the differential amplifiers split between the two modifiers for one particular polarity of deflection signal. Instead of one modifier correcting for both positive and negative control signals, separate modifiers are used, one for each polarity of control signal. This provides an additional degree of flexibility and particularly useful when the cathode-ray tube has non-symmetrical characteristics.

Figure 6:
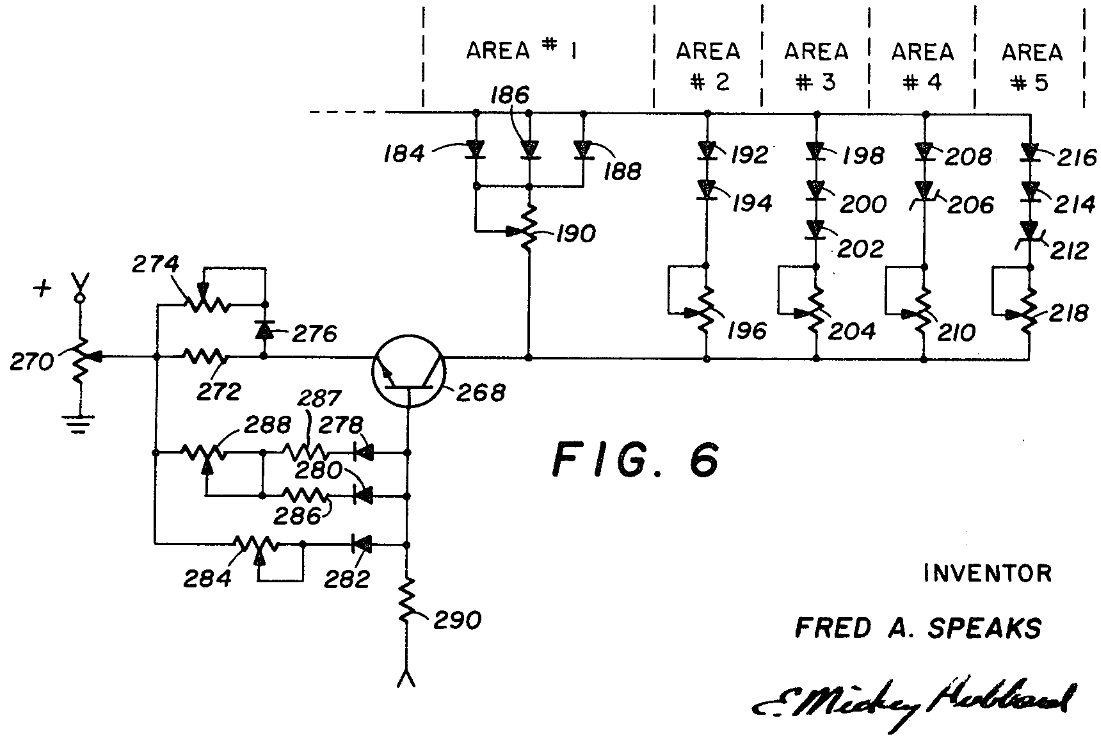
FIG. 6 is a simplification of the system of FIG. 4 where all the breakpoint circuits are connected in parallel to one linear amplifier.

Referring to FIG.6, there is shown a simplification of the system of FIG. 4 wherein the five breakpoint areas are interconnected to one linear amplifier consisting of a transistor 268. Using the same reference numerals for the breakpoint area circuits in FIG. 6 as has been used in FIG. 4, the paralleled diodes 184, 186 and 188 are arranged in series with a potentiometer 190 which connects to the collector electrode of the transistor 268 along with the circuit of the second breakpoint area consisting of diodes 192 and 194 in series with a potentiometer 196. Also tied to the collector electrode of the transistor 268 is a third breakpoint area circuit made up of diodes 198, 200 and 202 in series with a potentiometer 204. The fourth breakpoint area circuit consists of a Zener diode 206, a diode 208 and a potentiometer 210, and the fifth breakpoint area circuit includes a Zener diode 212, diodes 214 and 216, and a potentiometer 218. The fourth and fifth breakpoint area circuits are also interconnected to the collector electrode of the transistor 268. More breakpoint control circuits may be added if warranted by tube size or degree of linearity required.

The biasing circuit for the linear amplifier of FIG. 6 is slightly modified from that previously described. A variable bias voltage is generated at the wiper arm of a potentiometer 270 interconnected to the positive terminal of a direct current supply (not shown) and to ground. In series with the wiper arm of the potentiometer 270 and the emitter electrode of the transistor 268 is a resistor 272 which parallels a potentiometer 274 in series with a diode 276.

The slope shaping network of the system of FIG. 6 is similar to that described previously and includes diodes 278, 280 and 282 in respective parallel networks. The diode 282 is in series with a potentiometer 284 which connects to the wiper arm of the potentiometer 270. The diode 280 is in series with a resistor 286 and a potentiometer 288 which also connects to the wiper arm of the potentiometer 270. Also coupled to the potentiometer 288 is the diode 278 and a series resistor 287. A base drive resistor 290 ties to a circuit for producing the absolute value of the opposite deflection signal and to the base electrode of the transistor 268.

In operation, the circuit of FIG. 6 is similar to that of FIG. 4 with the exception that one transistor corrects the deflection signal over the complete range of values. Of course, the circuit of FIG. 6 may be operated in a manner described with reference to FIG. 5 wherein two of the circuits shown would be connected in parallel to correct one polarity of a given deflection signal.

While several embodiments of the invention, together with modifications thereof, have been described in detail herein and shown in the accompanying drawings, it will be evident that various further modifications are possible.

What is claimed is:

1. Apparatus for modifying each of the deflection signals coupled to a cathode-ray tube to produce a linear display thereon, comprising:

(a) current modifying means for varying the magnitude of a first one of said deflection signals before coupling to said cathode-ray tube, said current modifying means including a plurality of linear amplifiers;

(b) a plurality of breakpoint circuits respectively connected to said linear amplifiers of said current modifying means, said breakpoint circuits each being responsive to a different level of said first deflection signal for changing the signal variation effected by said current modifying means; and (c) circuit means connected to said current modifying means, said circuit means being responsive to a second one of said deflection signals for controlling said current modifying means.

2. Apparatus for modifying each of the deflection signals coupled to a cathode-ray tube to produce a linear display thereon, comprising:

(a) a current modifying circuit for respectively varying the magnitude of a first one of said deflection signals prior to coupling to said cathode-ray tube, said current modifying circuit including a linear amplifier;

(b) a breakpoint circuit connected to said current modifying circuit, said breakpoint circuit being responsive to a predetermined level of said first deflection signal for changing the signal variation effected by said current modifying circuit; and (c) a signal responsive circuit connected to said current modifying circuit, said signal responsive circuit being responsive to a second one of said deflection signals for controlling said current modifying circuit.

3. The apparatus of claim 2 and further including biasing means for biasing said signal responsive circuit to vary the effect thereof for selected levels of said second deflection signal.

4. The apparatus of claim 2 wherein said breakpoint circuit includes signal selecting means for selecting deflection signals of a preselected polarity to be modified by said current modifying circuit.

5. The apparatus of claim 4 wherein said signal selecting means includes at least one diode and one resistor in series with said linear amplifier.

6. The apparatus of claim 2 and further including a voltage divider circuit connected to said current modifying circuit for biasing said current modifying circuit inoperative below a preselected level of said first deflection signal.

7. The apparatus of claim 6 wherein said signal responsive circuit includes a slope shaping circuit having at least one diode in series with at least one resistor, said slope shaping circuit being connected to said voltage divider and being responsive to the absolute value of said second deflection signal for controlling said current modifying means.

8. The apparatus of claim 7 wherein said linear amplifier is a transistor having a collector electrode connected to said breakpoint circuit, an emitter electrode connected to said voltage divider, and a base electrode connected to said slope shaping circuit.

9. The apparatus of claim 7 wherein said signal responsive circuit includes a plurality of aparallel connected slope shaping circuits connected to said voltage divider for controlling the magnitude of said second deflection signal coupled to said current modifying circuit.

10. The apparatus of claim 9 wherein each of said slope shaping circuits includes at least one diode in series with at least one resistor.

11. The apparatus of claim 2 wherein:

(a) said deflection signals include X and Y signals; and further includes (b) four circuit sections with each circuit section including a current modifying circuit, a breakpoint circuit, and a signal responsive circuit, wherein (c) a first circuit section is responsive to said X deflection signal for varying the magnitude of positive polarity Y deflection signals;

(d) a second circuit section is responsive to said X deflection signal for varying the magnitude of negative polarity Y deflection signals;

(e) a third circuit section is responsive to said Y deflection signal for varying the magnitude of positive polarity X deflection signals; and (f) a fourth circuit section is responsive to said Y deflection signal for varying the magnitude of negative polarity X deflection signals.

12. The apparatus of claim 2 and further including an on-axis control circuit responsive to said first deflection signal for varying the magnitude of said first deflection signal when the magnitude of said second deflection signal is substantially zero.

13. The apparatus of claim 2 wherein:

(a) said deflection signals include X and Y signals; and further including (b) two circuit sections with each circuit section including a current modifying circuit, a breakpoint circuit and a signal responsive circuit; wherein (c) the signal responsive circuit of said first circuit section is responsive to positive values of said second deflection signal; and (d) the signal responsive circuit of said second circuit section is responsive to negative values of said second deflection signal.

14. The apparatus of claim 2 wherein said signal responsive circuit includes a plurality of differential amplifiers connected to said linear amplifier of said current modifying circuit.

15. Apparatus for modifying each of the deflection signals coupled to a cathode-ray tube to produce a linear display thereon, comprising:

(a) a current modifying circuit for varying the magnitude of a first one of said deflection signals prior to coupling to said cathode-ray tube, said current modifying circuit including a linear amplifier;

(b) a plurality of breakpoint circuits connected to said linear amplifier of said current modifying circuit, each of said breakpoint circuits being responsive to a different level of said first deflection signal for chainging the signal variation effected by said current modifying means; and (c) a signal responsive circuit connected to said current modifying circuit, said signal responsive circuit being responsive to a second one of said deflection signals for controlling said current modifying circuit.

References Cited

UNITED STATES PATENTS

| | | | |
|---|---|---|---|
| 3,205,377 | 9/1965 | Nix | 315—24 X |
| 3,309,560 | 3/1967 | Popodi | 315—24 |
| 3,435,278 | 3/1969 | Carlock et al. | 315—24 |

RODNEY D. BENNETT, Jr., Primary Examiner

T. H. TUBBESING, Assistant Examiner